(12) United States Patent
Wang et al.

(10) Patent No.: US 12,549,257 B2
(45) Date of Patent: Feb. 10, 2026

(54) LINEAR-DRIVE PLUGGABLE OPTICS TRANSCEIVER

(71) Applicants: Tongqing Wang, Newark, CA (US); Ming Ding, Bellevue, WA (US); Xiaolei Huang, Chengdu (CN); Yu Tan, Chengdu (CN); Pengfei He, Chengdu (CN)

(72) Inventors: Tongqing Wang, Newark, CA (US); Ming Ding, Bellevue, WA (US); Xiaolei Huang, Chengdu (CN); Yu Tan, Chengdu (CN); Pengfei He, Chengdu (CN)

( * ) Notice: Subject to any disclaimer, the term of this patent is extended or adjusted under 35 U.S.C. 154(b) by 318 days.

(21) Appl. No.: 18/219,550

(22) Filed: Jul. 7, 2023

(65) Prior Publication Data

US 2024/0297715 A1 Sep. 5, 2024

Related U.S. Application Data

(60) Provisional application No. 63/450,062, filed on Mar. 5, 2023.

(51) Int. Cl.
*H04B 10/40* (2013.01)
*H04B 10/54* (2013.01)

(52) U.S. Cl.
CPC ............. *H04B 10/40* (2013.01); *H04B 10/54* (2013.01)

(58) Field of Classification Search
CPC .... H04B 10/40; H04B 10/54; H04B 10/2589; H04B 10/43; H04B 10/58; H04B 10/0795; H04B 10/5057
See application file for complete search history.

(56) References Cited

U.S. PATENT DOCUMENTS

| | | | |
|---|---|---|---|
| 2019/0128688 A1* | 5/2019 | Choi | H04W 4/90 |
| 2020/0274690 A1* | 8/2020 | Tanaka | H04B 10/40 |
| 2021/0218472 A1* | 7/2021 | Latchman | H04B 10/0775 |
| 2022/0069913 A1* | 3/2022 | Tanaka | G06F 9/4403 |

* cited by examiner

*Primary Examiner* — Hibret A Woldekidan (57) ABSTRACT

Embodiments of present invention provide a linear-drive pluggable optics (LPO) transceiver. The LPO transceiver includes a receiver path, which includes a receiver optical subassembly (ROSA) converting an input optical signal into an ingress electrical signal; and a linear transimpedance amplifier (TIA) with adjustable frequency transfer function (AFTF), the ingress electrical signal passing through the linear TIA to a host. The LPO transceiver also includes a transmitter path, which includes a linear driver with AFTF receiving an egress electrical signal from the host; and a transmitter optical subassembly (TOSA) converting the egress electrical signal from the linear driver to an output optical signal. A method of operating the LPO transceiver is also included.

17 Claims, 8 Drawing Sheets

LINEAR-DRIVE PLUGGABLE OPTICS TRANSCEIVER

FIELD OF THE INVENTION

The present application relates generally to high-speed data transmission, and more particularly relates to a linear-drive pluggable optics transceiver and its operational control.

BACKGROUND

Pluggable optics modules such as high-speed pluggable optical transceivers are widely used in large-scale data centers. For optical transceivers with operation data rate at 100 Gbps or higher, usually multiple signal lanes are used. For example, 4000 DR4 optical transceivers normally use 4×53 GBaud (or 8×26 GBaud) electrical pulse amplitude modulation 4-level (PAM4) signals at host interface and 4×53 GBaud (or 8×26 GBaud) optical PAM4 signals at line interfaces. For non-return-to-zero (NRZ) signals, data rate is the same as baud rate because each symbol of the NRZ signal only has or carries 1 bit. However, when high-level modulation is used such as PAM4 signal modulation, data rate (bit per second) becomes higher and for PAM4 signals the data rate becomes twice of its baud rate (baud per second). For example, a 25 GBaud PAM4 signal is capable of transmitting data at a rate of 50 Gbps because each symbol of a PAM4 signal includes or carries 2 bits.

Transmission lines on printed circuit board (PCB) are generally used to carry data signals between an optical transceiver and an application specific integration circuit (ASIC) that hosts the optical transceiver. It is well known in the art that an electrical signal propagating through a transmission line on a PCB often experiences signal loss. The extent of the signal loss caused by the transmission line varies, and generally increases with the increase in signal frequency or data rate and increase in length of the transmission line.

Figure 1:
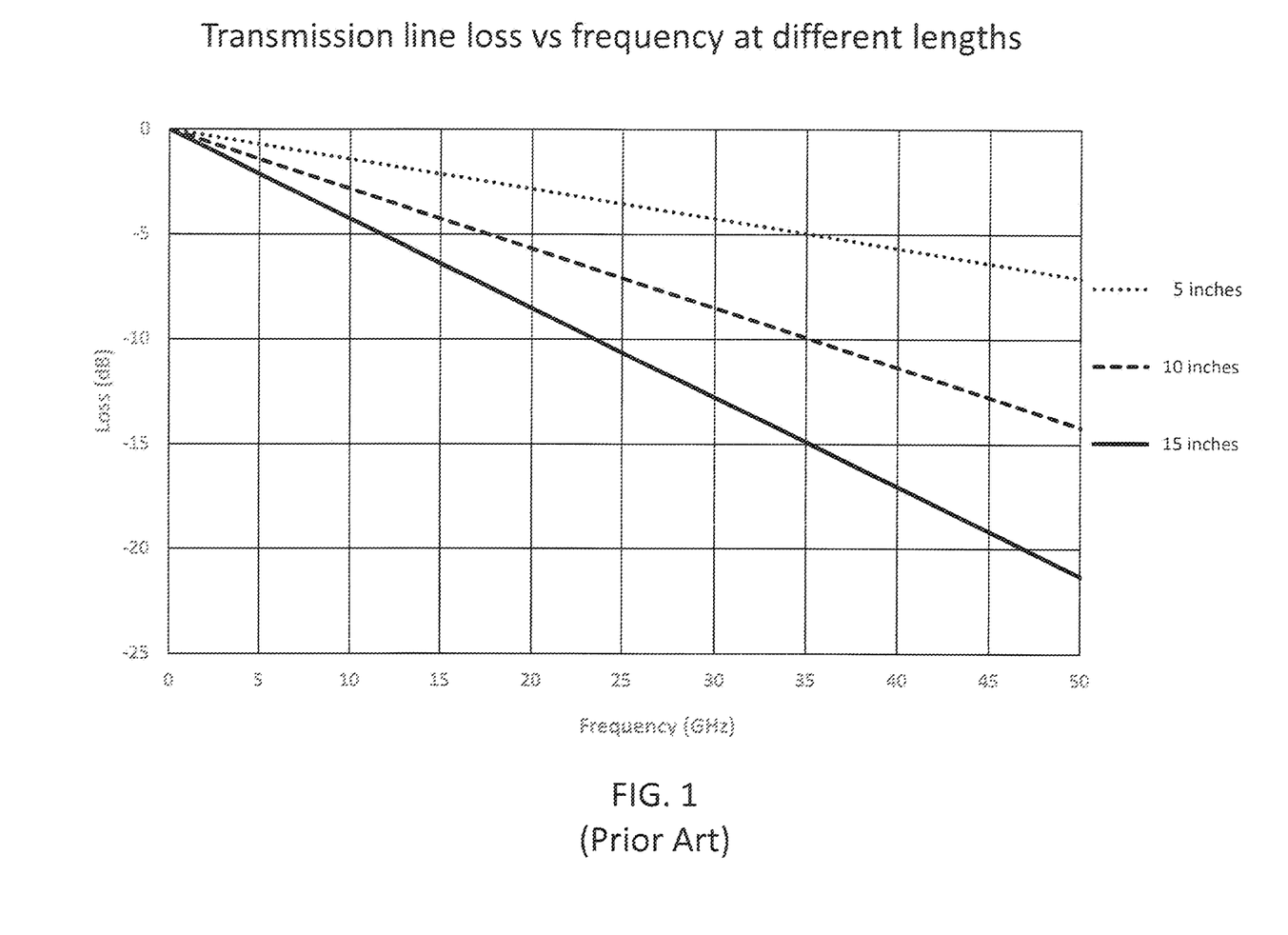
FIG. 1 is a chart of transmission line loss versus frequency of signals at three different lengths of a PCB transmission line.

A typical chart of transmission line loss versus signal frequency is shown in FIG. 1 at three different lengths of 5 inches, 10 inches, and 15 inches of a transmission line. This frequency-dependent loss of PCB transmission line limits the bandwidth of signal channel and may cause inter-symbol interference (ISI) of the signals that pass through the transmission line. From the chart in FIG. 1, it becomes apparent that as the signal data rate becomes higher, the quality of signal may suffer worse degradation at the receiver end. Because of this, certain means of signal quality enhancement or distortion mitigation technique may become desirable and/or even necessary to continue obtaining or achieving substantially "error free" data transmission. This is particularly true for high-speed data link with the use of high-speed pluggable optical transceivers, where the transceivers transmit and/or receive PAM4 or other type of high-level modulation signals.

Figure 2:
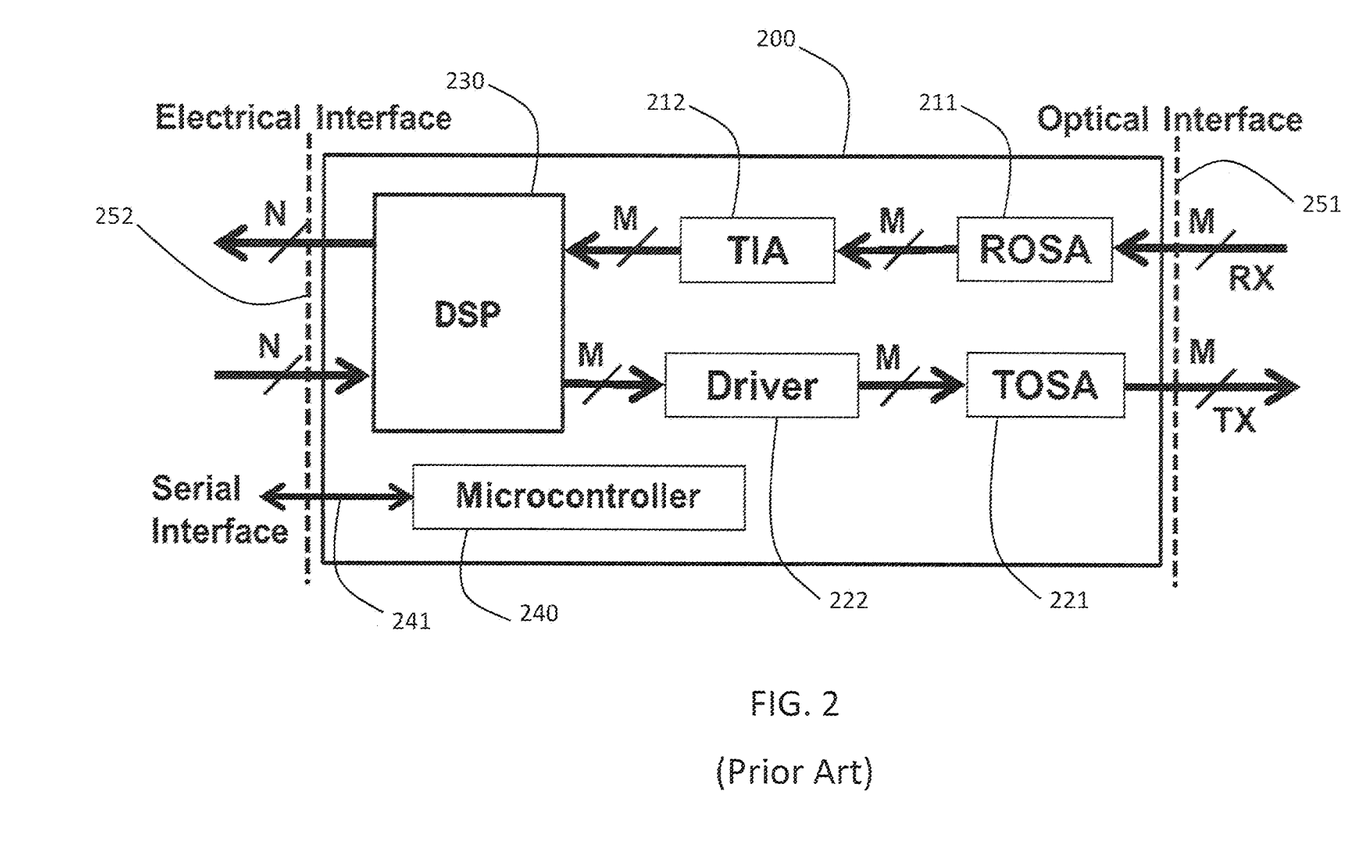
FIG. 2 is a simplified block diagram of a pluggable optical transceiver with a DSP chip as is known in the art.

Currently, majority of high-speed pluggable optical transceivers use data reshaping circuits such as, for example, a digital signal processor (DSP) chip and/or a clock data recovery (CDR) unit to improve quality of received signal and to accommodate variation in quality of signal caused by link loss or distortion. FIG. 2 illustrates a simplified block diagram of a pluggable optical transceiver 200 with a DSP chip 230, where N is the number of signal lanes at the electrical interface 252 (also known or referred to as host interface or system interface) and M is the number of signal lanes at the optical interface 251 (also known or referred to as line interface). The DSP chip 230 is capable of mitigating link distortion through its built-in digital equalizers such as finite impulse response (FIR) equalizers, decision-feedback equalizers (DFE), and other digital signal processing capacities.

The pluggable optical transceiver 200 has a transmitter path and a receiver path. The transmitter path includes a driver 222 to boost electrical signals from the DSP chip 230 and a transmitter optical subassembly (TOSA) 221 that converts the electrical signals from the driver 222 into optical signals to be launched into a fiber link (not shown). The receiver path includes a receiver optical subassembly (ROSA) 211 that converts received optical signals into electrical signals and a transimpedance amplifier (TIA) 212 that amplifies the electrical signals from the ROSA 211 to a proper signal level to be further processed by the DSP chip 230.

The DSP chip 230 has a transmitter side and a receiver side. At the transmitter side, the DSP chip 230 uses a FIR equalizer to boost high-frequency content of received electrical signals before sending the electrical signals through the link channel to the driver 222. At the receiver side, the DSP chip 230 applies its FIR and/or DFE equalizers to mitigate possible ISI distortion of electrical signals from the TIA 212 thereby improving link performance. The ROSA 211, the TIA 212, the driver 222, and the TOSA 221 are all electrically connected to and functionally controlled by a microcontroller 240, and the connection may be made via a serial interface 241 or some general-purpose input/output (not shown).

When a DSP chip is used, the number of signal lanes at the electrical interface and the number of signal lanes at the optical interface may not always be the same. In other words, in the above example N and M may not always be the same. Sometimes different N and M such as, for example, N=8 and M=4 may be used. Because a DSP chip can handle different N and M, sometimes a DSP chip is referred to as a "gearbox" chip. However. DSP chips consume a lot of electricity during operation, have high manufacturing cost, and introduce undesirable latency to data connection links.

The emergence of supercomputing and artificial intelligence (AI) applications is driving the bandwidth demand and motivating mega data center operators to explore high-density, low latency and lower power data connection solutions. For example, the AI and mega data center applications may use hundreds of thousands of high-speed optical transceivers in one big system, and in this case the power consumption may be a big issue. Any improvement in power consumption and cost reduction will have a big impact on this type of applications. In addition, low latency is critical to supercomputing applications.

SUMMARY

Embodiments of present invention provide a linear-drive pluggable optics (LPO) module. The LPO module may be an LPO transceiver that may include a receiver path and a transmitter path. The receiver path may include a receiver optical subassembly (ROSA) converting an input optical signal into an ingress electrical signal; and a linear transimpedance amplifier (TIA) with adjustable frequency transfer function (AFTF), the ingress electrical signal passing through the linear TIA to a host. The transmitter path may include a linear driver with AFTF receiving an egress electrical signal from the host; and a transmitter optical subassembly (TOSA) converting the egress electrical signal from the linear driver with AFTF into an output optical signal.

In one embodiment, the linear TIA with AFTF includes a TIA; a continuous time linear equalizer (CTLE); a variable gain amplifier (VGA); and a signal analyzer, where the TIA, the CTLE, and the VGA are functionally connected in a series and provide a portion of the ingress electrical signal as feedback via the signal analyzer for controlling and monitoring.

In another embodiment, the linear driver with AFTF includes a variable gain amplifier (VGA); a continuous time linear equalizer (CTLE); a boost amplifier (BA); and a signal analyzer, where the VGA, the CTLE, and the BA are functionally connected in a series and provide a portion of the egress electrical signal as feedback via the signal analyzer for controlling and monitoring.

In one embodiment, both the input optical signal and the output optical signal have a signal rate of 25 GBaud or higher and are PAM4 optical signals.

In one embodiment, initial operating points of the transmitter path of the LPO transceiver are set up based on pre-calibrated information pre-stored in a look-up table (LUT) of the LPO transceiver during a stage of manufacturing thereof.

In another embodiment, initial operating points of the transmitter path of the LPO transceiver are set up based on link information provided by the host when no pre-calibrated information is stored in a look-up table (LUT) of the LPO transceiver.

In yet another embodiment, initial operating points of the transmitter path of the LPO transceiver are set up based on default setting of the LPO transceiver when no link information is provided by the host.

According to one embodiment, operating points of the transmitter path of the LPO transceiver are controlled by a microcontroller based on the feedback of the egress electrical signal.

In one embodiment, operating points of the receiver path of the LPO transceiver are controlled by a microcontroller based on bit-error-rate (BER) or signal-to-noise ratio (SNR) provided by the host.

In another embodiment, operating points of the receiver path of the LPO transceiver are controlled by a microcontroller based on the feedback of the ingress electrical signal when neither bit-error-rate (BER) nor signal-to-noise ratio (SNR) is provided by the host.

Embodiments of present invention provide a method of operating an LPO transceiver. The method includes sending a request to a host of the LPO transceiver for link information; and when no response is received from the host, setting an initial operating condition of the LPO transceiver using a default setup.

In one embodiment, when link information is received from the host, but there is no pre-calibrated host information stored in a look-up table of the LPO transceiver, the method includes setting an initial operating condition of the LPO transceiver using the link information received from the host.

In another embodiment, when pre-calibrated host information is stored in the look-up table of the LPO transceiver, the method includes setting an initial operating condition of the LPO transceiver using the pre-calibrated host information stored in the look-up table.

In one embodiment, the method further includes providing feedback via a signal analyzer in a transmitter path of the LPO transceiver; and controlling and monitoring operation condition of the transmitter path based on the feedback.

In another embodiment, the method further includes providing feedback via a signal analyzer in a receiver path of the LPO transceiver; and controlling and monitoring operation condition of the receiver path based on the feedback.

In yet another embodiment, the method further includes receiving either a bit-error-rate (BER) or a signal-to-noise ratio (SNR) from the host; and controlling and monitoring operation condition of the receiver path based on either the BER or the SNR.

BRIEF DESCRIPTION OF THE DRAWINGS

The present invention will be understood and appreciated more fully from the following detailed description of embodiments of the invention, taken in conjunction with accompanying drawings of which.

It will be appreciated that for simplicity and clarity purpose, elements shown in the drawings have not necessarily been drawn to scale. Further, in various functional block diagrams, two connected devices and/or elements may not necessarily be illustrated to be connected. In some other instances, grouping of certain elements in a functional block diagram may be solely for the purpose of description and may not necessarily imply that they are in a single physical entity, or they are embodied in a single physical entity.

DETAILED DESCRIPTION OF PREFERRED EMBODIMENT

Embodiments of present invention provide a system and apparatus for controlling operation of a linear-drive pluggable optics (LPO) module such as, for example, an LPO transceiver for high-speed data transmissions. The LPO transceiver may include a transmitter path that includes a linear driver with adjustable frequency transfer function (AFTF) for receiving an egress electrical signal from a host, and a transmitter optical subassembly (TOSA) for converting the egress electrical signal to an output optical signal. The LPO transceiver may also include a receiver path that includes a receiver optical subassembly (ROSA) for converting an input optical signal into an ingress electrical signal, and a linear transimpedance amplifier (TIA) with AFTF for passing the ingress electrical signal to the host.

Figure 3:
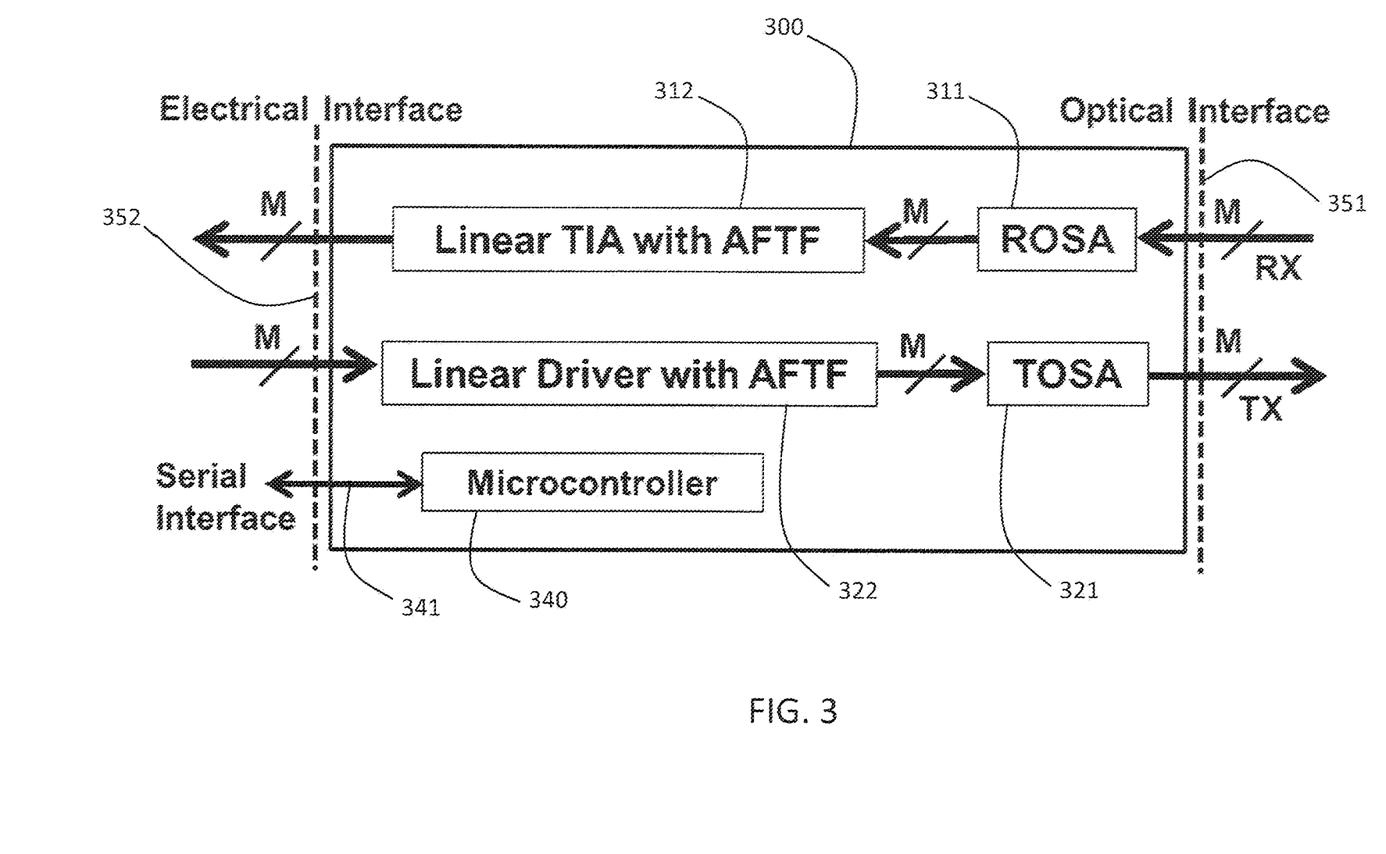
FIG. 3 is a demonstrative illustration of a simplified block diagram of a linear-drive pluggable optics transceiver according to one embodiment of present invention.

More particularly, FIG. 3 is a demonstrative illustration of a simplified block diagram of an LPO transceiver 300 according to one embodiment of present invention. A receiver path of the LPO transceiver 300 may include a ROSA 311 and a linear TIA 312 with AFTF; the ROSA 311 may convert an input optical signal into an ingress electrical signal and the ingress electrical signal may pass through the linear TIA 312 with AFTF to a host. A transmitter path of the LPO transceiver 300 may include a linear driver 322 with AFTF and a TOSA 321; and linear driver 322 with AFTF may receive an egress electrical signal from the host and the TOSA 321 may convert the egress electrical signal from the linear driver 322 into an output optical signal.

The LPO transceiver 300 may further include signal analyzers, whose details are provided later in connection with FIG. 4A and FIG. 4B, at its transmitter and receiver paths inside the linear driver 322 and the linear TIA 312 respectively for operational control of the LPO transceiver 300. The TOSA 321 and the ROSA 311 inside the LPO transceiver 300 may be either separately packaged components or assembled together with the linear driver 322 and/or the linear TIA 312 through the so-called co-package, hybrid integration, or chip-on-board technologies.

The TOSA 321 may be any form of electrical to optical (EO) converting component or components such as a light-emitting diode (LED), a vertical-cavity surface-emitting laser (VCSEL), a directly modulated laser (DML), an electro-absorption modulated laser (EML), a Mach-Zehnder interferometer (MZI) modulator, and so on. The ROSA 311 may be any form of photon detectors such as a PIN photodiode (PD) an avalanche photodiode (APD), and so on. The LPO transceiver 300 may operate at 25 GBaud or higher of signal rate per each signal lane and the signals operated upon by the LPO transceiver 300 may be PAM4 signals. According to embodiments of present invention, the LPO transceiver 300 has the advantages of lower power consumption, lower cost, and lower latency over other optical transceivers such as those mentioned above that rely on DSP chips for signal processing. The LPO transceiver 300 may be packaged with various form factors, including but not limited to SFP28, SFP56, SFP112, SFP-DD, QSFP28, QSFP56, QSFP112, QSFP-DD, OSFP, CFP2, CFP4, and so on.

The LPO transceiver 300 may get connected to a host board on a host PCB through a pluggable connection interface which may be referred to as a pluggable connector. The LPO transceiver 300 may include a transmitter path and a receiver path. Functions of the transmitter path may include, for example, receiving electrical signals of data from host egress transmitters (not shown) through the linear driver 322; converting the received electrical signals to optical signals through the TOSA 321 that meets pre-defined optical transmitter requirements (such as average optical power, extinction ratio, eye mask for NRZ signal or TDECQ for PAM4 signals); and sending the optical signals through an optical interface 351 to a fiber link (not shown). Functions of the receiver path may include, for example, receiving optical signals at the optical interface 351 from the same or a different fiber link; converting the optical signals to electrical signals through the ROSA 311; raising or boosting the electrical signals level through the linear TIA 312 to meet pre-defined requirements at an electrical interface 352; and sending the electrical signals through the pluggable connection interface to host ingress receivers (not shown).

The received data signals, electrical and/or optical, at the electrical and optical interfaces 352 and 351 may have large variations depending upon the host high-speed RF (radio frequency) transmission line designs and optical link loss. The quality of received signal may also suffer from the transmission line impedance mismatch and optical reflections. The degradation of the received data signals may not be a serious issue for the DSP chip-based transceivers because DSP chips are generally able to accommodate a wide range of link loss variations through the adaptive equalization capability of the DSP chip. However, the DSP chip-based digital equalization capabilities are not available in an analog component based LPO transceiver. In an LPO transceiver, there is no data recovering or processing circuits such as a CDR unit or DSP chip. Signals in an LPO transceiver are in a continuous analog form. Digital signal processing techniques are therefore not applicable to signals in an LPO transceiver.

Embodiments of present invention provide an IPO module, and particularly an LPO transceiver 300 that can accommodate loss variations, such as those discussed above, and mitigate possible ISI distortions caused by frequency-dependent loss of PCB transmission lines. As being demonstratively illustrated in FIG. 3, the LPO transceiver 300 may include a linear driver 312 with AFTF and a linear TIA 322 with AFTF, functions of which are described below in more details.

Figures 4A, 4B:
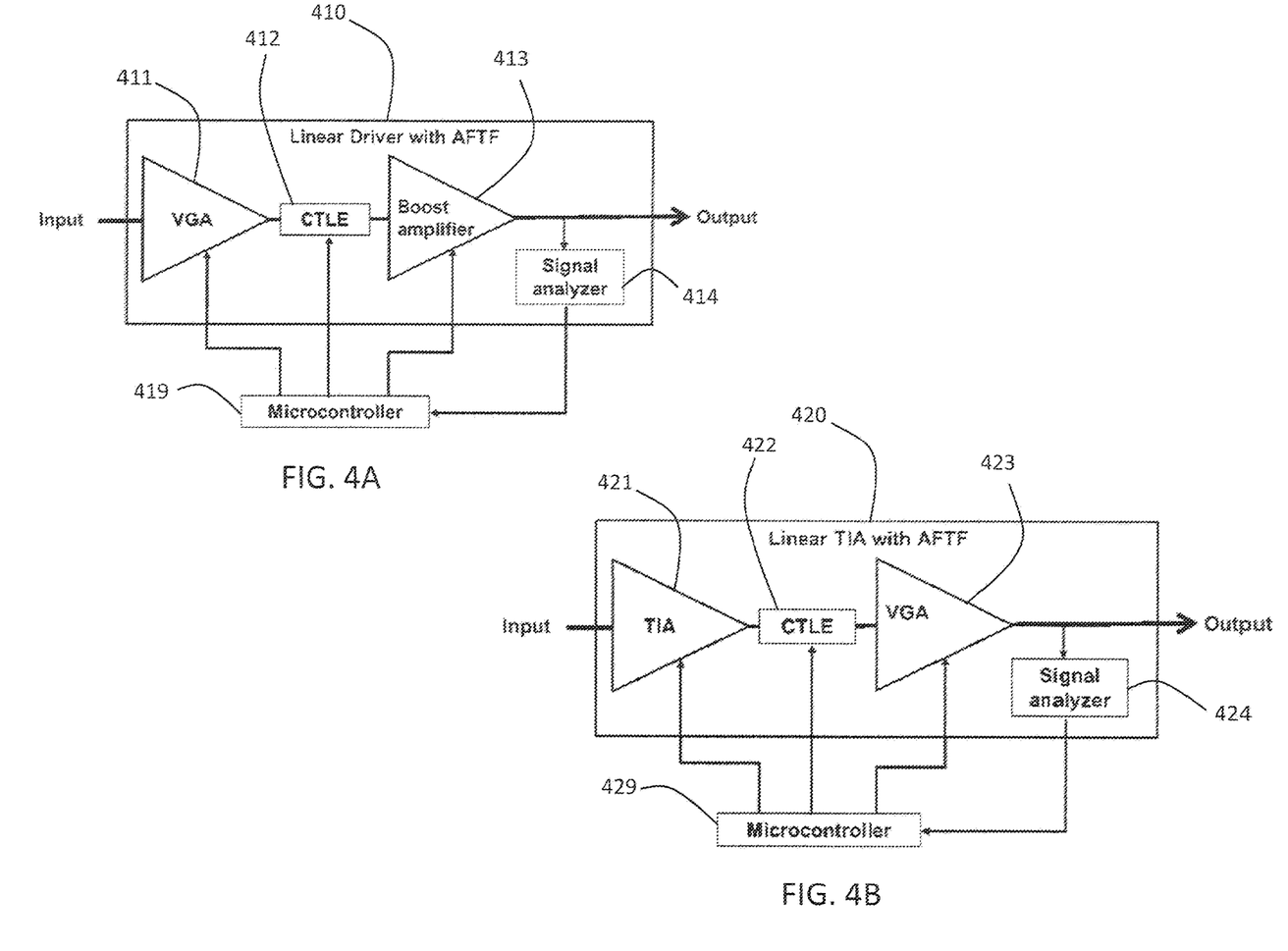
FIG. 4A and FIG. 4B are demonstrative illustrations of block diagrams of a linear driver and a linear transimpedance amplifier with adjustable frequency transfer function according to some embodiments of present invention.

FIG. 4A and FIG. 4B are demonstrative illustrations of simplified block diagrams of a linear driver 410 with AFTF and a linear TIA 420 with AFTF according to some embodiments of present invention. More particularly, as is illustrated in FIG. 4A, the linear driver 410 with AFTF may include a variable gain amplifier (VGA) 411, a continuous time linear equalizer (CTLE) 412, and a boost amplifier (BA) 413 connected in a series, and a signal analyzer 414, all of which may also be connected to and functionally and operationally controlled by a microcontroller 419. In one embodiment, the microcontroller 419 may be, for example, a same microcontroller as the microcontroller 340 being illustrated in FIG. 3.

The VGA 411 may be used to compensate the variations of received egress electrical signals at host electrical interface through changing its amplification gain. The CTLE 412 may mitigate signal degradations caused either by the frequency-dependent loss of the PCB transmission lines or due to bandwidth limitations of the TOSA 321. The BA 413 may raise the level of egress electrical signals to drive the TOSA 321 to meet the pre-defined requirements. A small portion of the egress electrical signals from the BA 413 may be sent to the signal analyzer 414 and via the signal analyzer 414 to the microcontroller 419, providing feedback for operational control of the LPO) transceiver 300 including controlling of the transmitter path and continuous monitoring of any link performance changes which may be caused by change in operation conditions such as operating temperature, supply voltages, and so on. Functions of the signal analyzer 414 will be described below in further details.

In FIG. 4B, the linear TIA 420 with AFTF may include a TIA 421, a CTLE 422, and a VGA 423 connected in a series, and a signal analyzer 424, all of which may also be connected to and functionally and operationally controlled by a microcontroller 429. In one embodiment, the microcontroller 429 may be, for example, a same microcontroller as the microcontroller 340 being illustrated in FIG. 3. The TIA 421 may amplify ingress electrical signals received from the ROSA 311, which converts an input optical signal received from the line-side optical interface into the ingress electrical signals. The CTLE 422 may be used to compensate frequency-dependent loss of the PCB transmission lines and bandwidth limitations of the ROSA 311. The CTLE 422 may provide additional high-frequency peaking to compensate transmission line loss on host PCB. The VGA 423 may be used to accommodate the variations of received input optical signals at optical line interface through changing its amplification gain. The VGA 423 may also raise the level of the ingress electrical signals to meet the pre-defined requirements at the electrical host interface. A small portion of the ingress electrical signals from the VGA 423 may be sent to the signal analyzer 424, and via the signal analyzer 424 to the microcontroller 429, providing feedback for the operational control of the LPO transceiver 300 including controlling of the receiver path and continuous monitoring of any link performance changes which may be caused by change in operation conditions such as operating temperature, supply voltages, receiving optical power, and so on. Functions of the signal analyzer 424 will be described below in further details.

In one embodiment, the CTLE 412 and/or CTLE 422 may include multiple stages of active and/or passive frequency response reshaping filters. Each stage of frequency response (or gain profile) reshaping filter may be capable of adjusting peaking frequency, shape of frequency response, and gain at the peaking frequency. The frequency-dependent losses of the electrical signals caused by the PCB transmission lines may therefore be compensated by properly setting the frequency response of the CTLE 412 and/or CTLE 422.

Moreover, embodiments of present invention are not limited to those illustrated in FIG. 4A and FIG. 4B. For example, arrangement and/or interconnections of the various functional blocks including the VGA 411 and 423, the CTLE 412 and 422, the BA 413, the TIA 421, and the signal analyzer 414 and 424, may be made differently from those illustrated in FIG. 4A or FIG. 4B, and such arrangement and/or re-arrangement are fully contemplated by the present invention, and should be considered as within the spirit of present invention. For example, the CTLE 412 may be placed before the VGA 411 in the linear driver with AFTF 410. Further for example, a different type of equalizer instead of a CTLE may be used as well.

Figure 5:
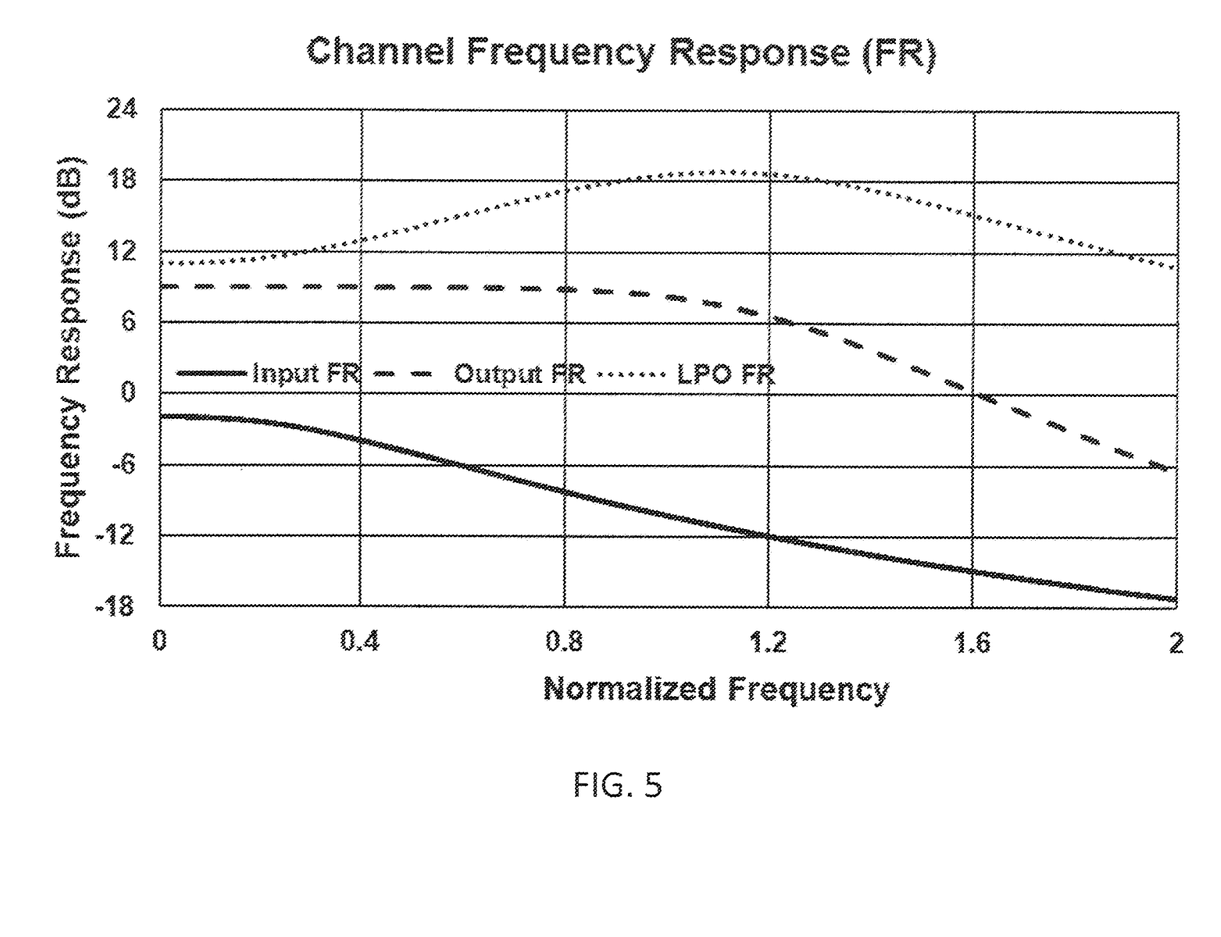
FIG. 5 is a channel frequency response being normalized to the Nyquist frequency according to one embodiment of present invention.

FIG. 5 is a demonstrative illustration of channel frequency response of an LPO transceiver using a linear driver with AFTF to compensate transmission losses of electrical signal according to embodiments of present invention. The channel frequency response is normalized to signal Nyquist frequency. As is shown in FIG. 5, the input channel at Nyquist frequency has around 10 dB loss. Input channel bandwidth is around 0.5×Nyquist frequency. As is shown by the solid line in FIG. 5, the data signal at the electrical interface of the LPO transceiver 300 suffers a severe distortion due to the bandwidth limitation. According to one embodiment of present invention, the linear driver 322 was able to not only boost the input signal level but also improve its channel frequency response through adjusting gain of the VGA 411 and frequency response of the CTLE 412. The frequency response of the LPO transceiver 300 is shown by the dotted line in FIG. 5. The circuitry of the CTLE 412 provides about 7 dB peaking at the Nyquist frequency. The resulting channel frequency response at the output of the LPO transceiver 300 is shown by the dashed line in FIG. 5. The channel bandwidth at the output of the LPO transceiver 300 is around 1.2×Nquist frequency. The signal at low frequency has around 9 dB gain. The compensation provided by the linear driver 322 with AFTF demonstrated a significant improvement on the channel frequency response.

According to one embodiment, the link transfer function of the linear driver 322 with AFTF may also vary with operation conditions which may include, for example, input signal level, operating temperature, supply voltages, and so on. As being mentioned above, the linear driver 322 with AFTF may also include a signal analyzer 414 to provide feedback for the operational control of the LPO transceiver 300, and continuously monitor any link performance changes which may be caused by changes in operation conditions.

Figure 6:
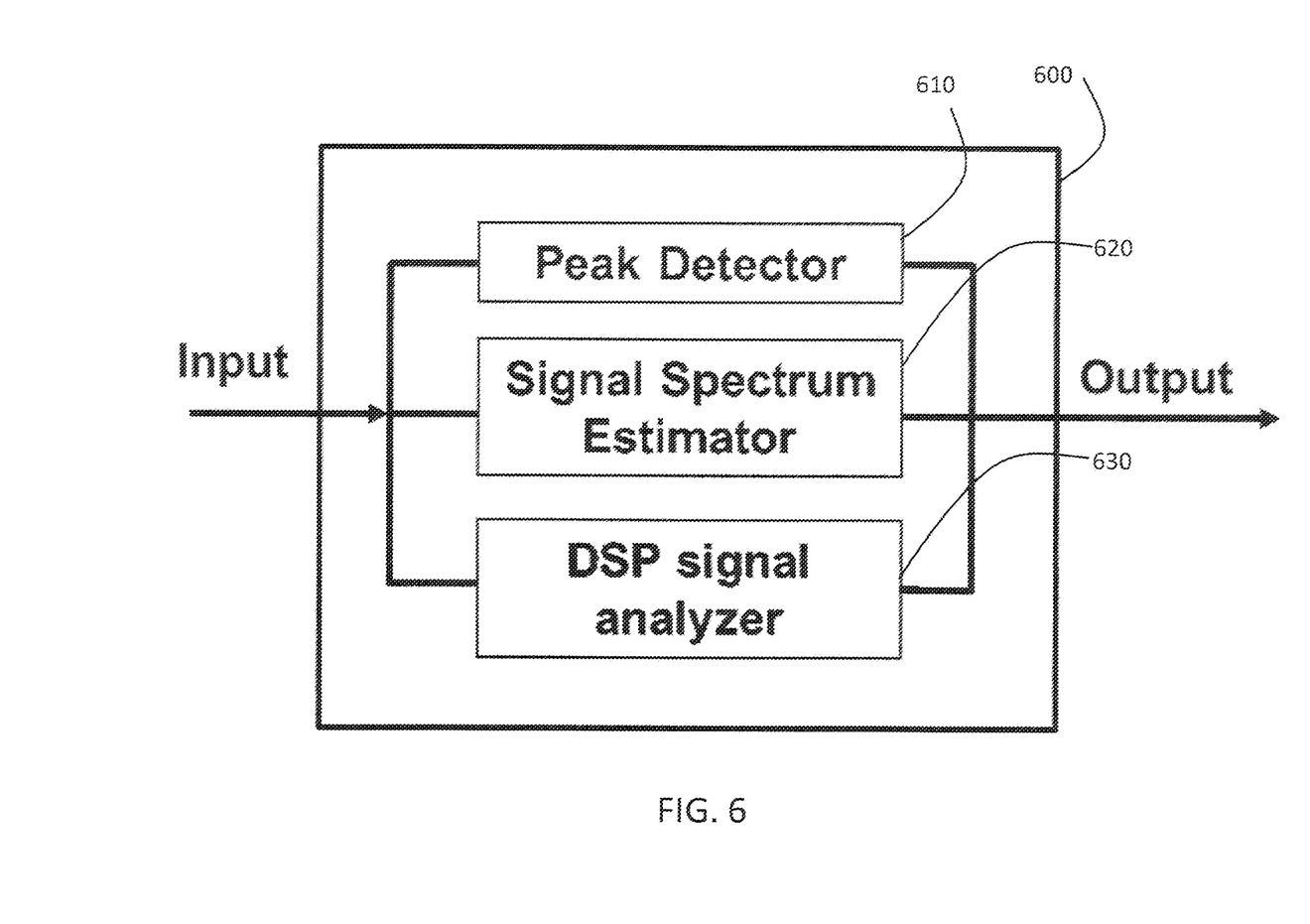
FIG. 6 is a demonstrative illustration of a simplified block diagram of a signal analyzer according to one embodiment of present invention.

FIG. 6 is a demonstrative illustration of a simplified block diagram of a signal analyzer 600 according to one embodiment of present invention. More particularly, the signal analyzer 600 may include a peak detector 610, a signal spectrum estimator 620, and a DSP signal analyzer 630. When being used at the transmitter path (and similarly at the receiver path), the peak detector 610 may be used to detect peak signal level which may be used for gain adjustment of the VGA 411. The signal spectrum estimator 620 may be used to detect signal strength at certain interesting frequencies such as, for example, at 0.2×baud rate, 1×baud, and 1.2×baud rate. The signal spectrum estimator 620 may be implemented by a narrow-band signal detector. The bandwidth of the narrow-band signal detector may also be adjustable. For example, the bandwidth of the narrow-band signal detector may be adjusted to be in the range of 0.1×baud rate. The DSP signal analyzer 630 may convert its input signal to digital signal through a window detector or analog-digital converter (ADC) circuit. The DSP signal analyzer 630 uses digital signal processing techniques to analyze the input signal quality and provide feedback to the microcontroller 419 to control the transmitter path operation of the LPO transceiver 300.

According to one embodiment, the DSP signal analyzer 630 illustrated in FIG. 6 may be different from currently known DSP chips which are used in the main data signal path of the optical transceivers such as the DSP chip 230 illustrated in FIG. 2. The DSP signal analyzer 630 illustrated in FIG. 6 may only need to analyze the input signal quality to provide feedback for the operational control of the transmitter path of the LPO transceiver 300. The DSP signal analyzer 630 does not need to recover input data signals. In addition, the DSP signal analyzer 630 is not placed in the main signal path. Because of the above, use of the DSP signal analyzer 630 does not impact the latency of link that is critical to time sensitive applications. It should also be noted that implementation of the signal analyzer 600 may not necessarily include all the functional blocks illustrated in FIG. 6. For example, for some applications, the signal analyzer 600 may only need to have one functional block, such as the peak detector 610, or any combinations of the available functional blocks.

The LPO transceiver 300 has a serial interface 341 (which may also be referred to as serial management interface, service interface, or service channel) as is illustrated in FIG. 3 to communicate with the host. Some commonly used serial management interfaces for the communications between the host and the LPO transceiver 300 may include, but not limited to, I2C and management data input/output (MDIO). When the LPO transceiver 300 connects with the host through an interface, the service channel will establish the communications between the host and the LPO transceiver 300. The LPO transceiver 300 may receive link parameters from the host. The link parameters may include, but not limited to, host type, port number, data signal format (such as NRZ, PAM4, and so on), baud rate, estimated input channel frequency response, operating temperature, variations of channel loss over operating temperature. The microcontroller 340 may employ the link parameters to control the operation of the LPO transceiver 300.

Figure 7:
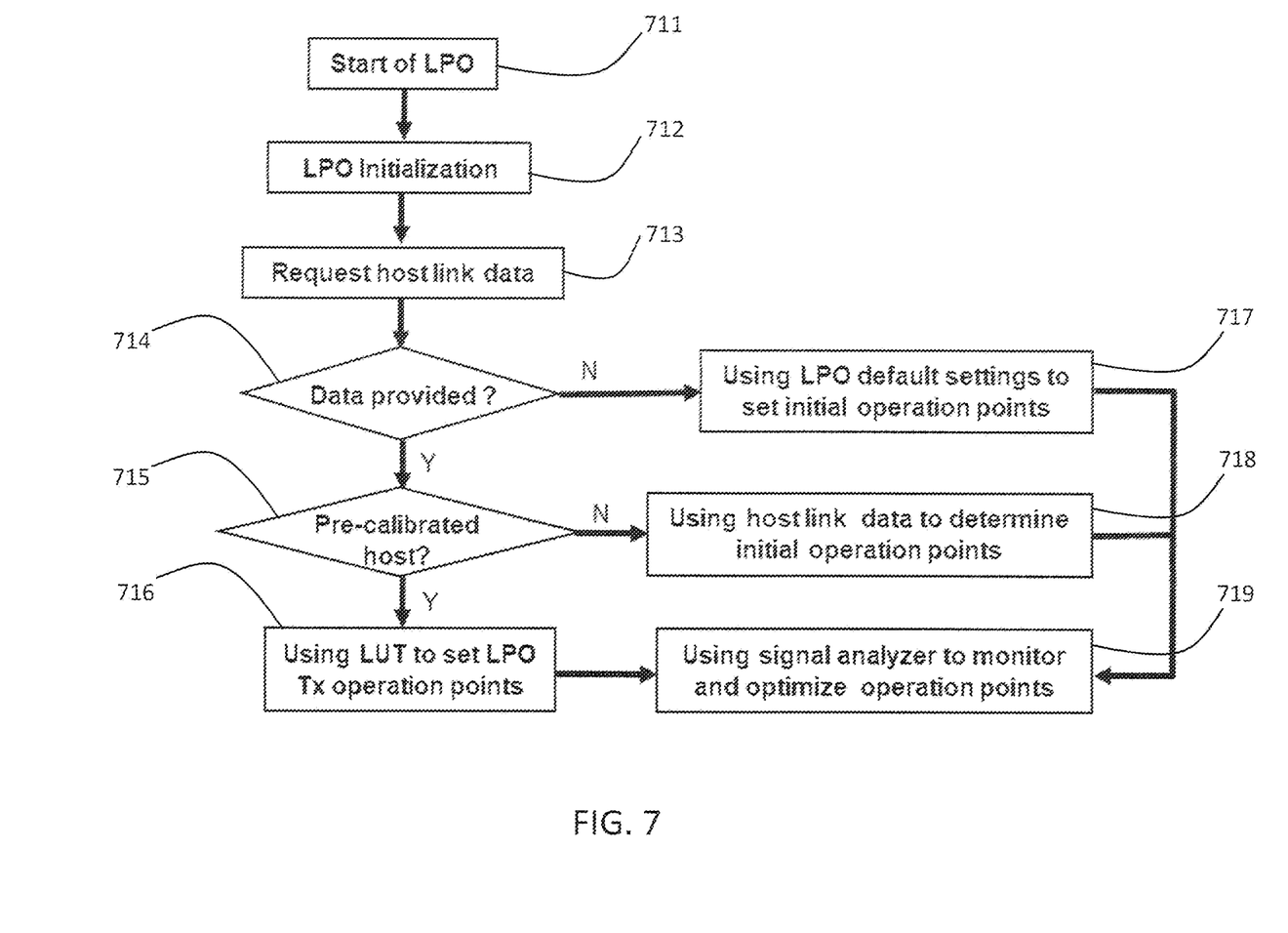
FIG. 7 is a simplified flowchart of operational control of a linear-drive pluggable optics transmitter path according to one embodiment of present invention.

FIG. 7 is a simplified flowchart of operational control of a transmitter path (also known as egress link) of an LPO module such as the LPO transceiver 300. More particularly, when being connected to the host interface, the LPO transceiver 300 will be powered up by the host interface. The microcontroller 340 in the LPO transceiver 300 will start operating (step 711) and performing initialization of the LPO transceiver 300 (step 712) to establish communications with the host and internal functional blocks as discussed above. To properly configure the transmitter path of the LPO transceiver 300 and set up its initial operating points, the microcontroller 340 may send a request to the host to obtain host link information or data (step 713). Contingent upon the response or no response from the host, the microcontroller 340 may determine how to set up the operating points of the transmitter path of the LPO transceiver 300.

As is demonstratively illustrated in FIG. 7, there may be three ways to configure the transmitter path (or egress link) of the LPO transceiver 300. The microcontroller 340 checks whether link information and/or data is provided by the host (step 714). The first scenario assumes that no response or link information is received from the host which means the host may not support the feature of providing its link information. In this case, the microcontroller 340 may use default setting of the transmitter path of the LPO transceiver 300 to set up its initial operation points (step 717). Thereafter, the microcontroller 340 may proceed to use the feedback from the signal analyzer 414 to monitor and optimize the operating points (step 719). As an example, the feedback from the signal analyzer 414 may include strength of the egress electrical signals and relative channel loss at certain interesting frequencies as those described above. Based on that, the microcontroller 340 uses its built-in control algorithm to adjust the operating points of the transmitter path of the LPO transceiver 300 to reach the targets that are pre-stored in the LPO transceiver 300 during the transceiver manufacturing or set up by the end-users.

When the link information and/or data is provided by the host (step 714), the second scenario is when the transmitter path of the LPO transceiver 300 does not have pre-calibrated information such as operating settings pre-stored in its lookup table (LUT) for the specific host (step 715). In this case, the microcontroller 340 may use the received data of link information and built-in algorithm to determine initial operating points of the transmitter path (step 718) of the LPO transceiver 300 and subsequently use the feedback from the signal analyzer 414 to monitor and optimize the operating points of the transmitter path (step 719) of the LPO transceiver 300.

The third scenario is when the transmitter path has the pre-calibrated information such as operating settings pre-stored in its LUT during a stage of its manufacturing for the specific host, the microcontroller 340 may proceed to use the pre-calibrated operating settings information pre-stored in the LUT for the specific host to setup the operating points of the transmitter path (step 716) of the LPO transceiver 300. After that, the microcontroller 340 may use the feedback from the signal analyzer 414 to monitor and optimize the operating points of the transmitter path of the LPO transceiver 300 (step 719).

For large-scale data centers, one aspect is that they use the same equipment, such as same servers and/or switches, and same optical transceivers in high volume (e.g., tens of thousands). Operating settings of the LPO transceivers to interface with specific high-volume equipment may be obtained through a pre-calibration procedure. The pre-calibration procedure may be accomplished at the LPO transceiver manufacturing stage through connecting the LPO transceivers to the specific equipment used in the volume, adjusting the operating points of the LPO transceivers to optimize the egress link performance, such as the LPO transceiver output eye diagrams, until a satisfied or pre-defined performance is attained. These operational settings or operating points are then stored in a lookup table of the LPO transceivers. It should be noted that data obtained in the pre-calibration procedure may be port dependent. For example, the LPO transceivers may store 32 operating settings for a specific model of 32-port 400 Gbps ethernet switch. The advantages of setting up the initial operating points of LPO transceivers using LUT include reduced link bring-up time and associated cost. After the initial operating points have been setup, the microcontroller 340 may use the feedback from the signal analyzer 414 to monitor and optimize the operating points.

It is to be noted that in differential signal transmitting. DC offset between positive and negative terminals may be critical to the link performance. Control of the operating points of the transmitter path of the LPO transceiver 300 should also include parameters associated with the DC offset of the positive and negative terminals.

Figure 8:
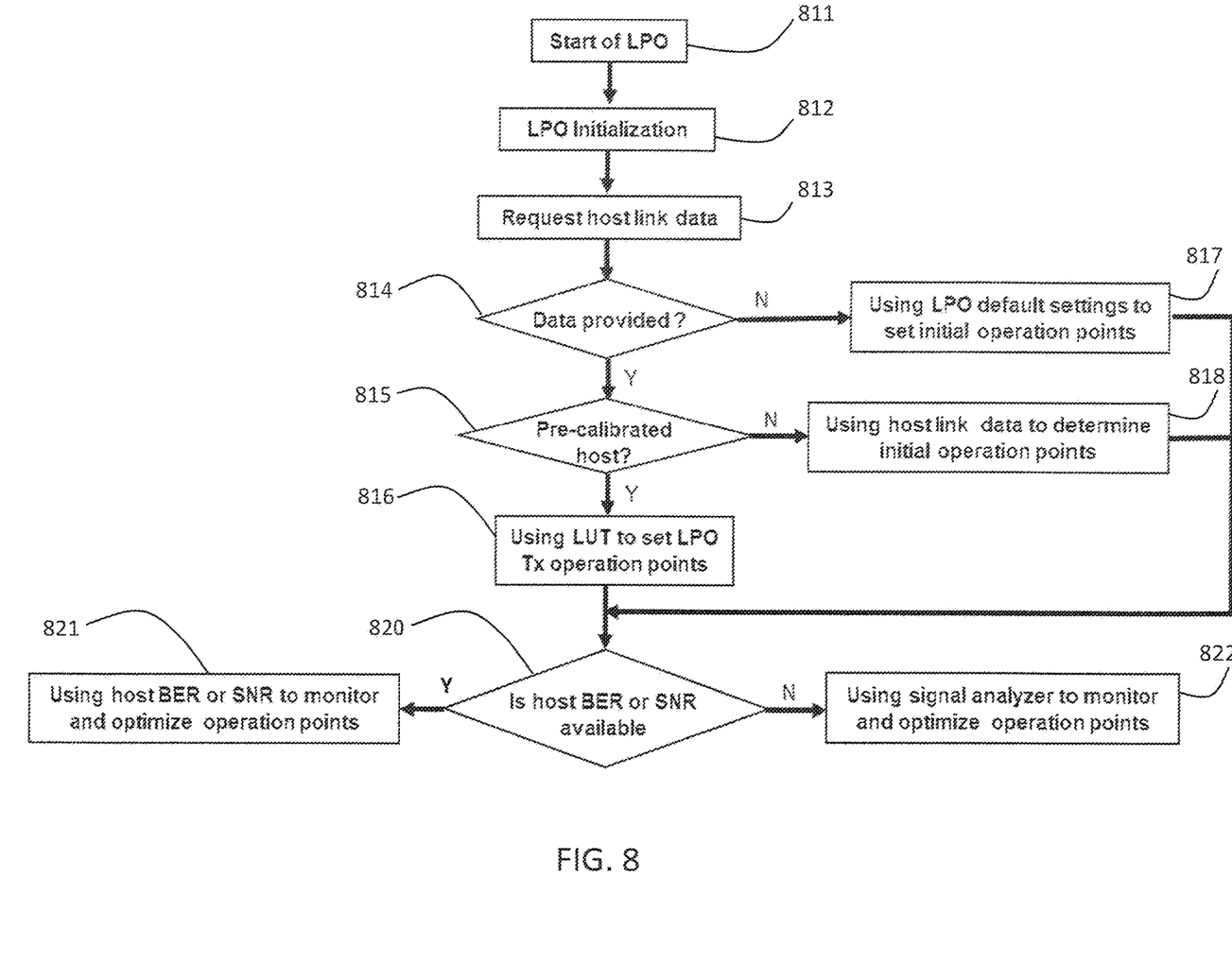
FIG. 8 is a simplified flowchart of operational control of a linear-drive pluggable optics receiver path according to one embodiment of present invention.

FIG. 8 is a simplified flowchart of operational control of the receiver path (or ingress link) of the LPO transceiver 300. The control process is similar to the operational control of the transmitter path (or egress link) of the LPO transceiver 300 as being described above in reference to FIG. 7. For example, upon being connected to the host interface, the microcontroller 340 in the LPO transceiver 300 will start the receiver path (step 811); perform initialization (step 812); and send a request to the host to obtain host link information or data (step 813).

The microcontroller 340 then checks whether link information and/or data is provided by the host (step 814). When no response is received from the host, default settings of the receiver path of the LPO transceiver 300 are used to set up its initial operation points (step 817). When response is received from the host but the receiver path does not have pre-calibrated information including operational settings pre-stored in its lookup table (LUT) (step 815), the microcontroller 340 uses the received data of link information and built-in algorithm to determine initial operating points of the receiver path (step 818) of the LPO transceiver 300. When pre-calibrated information including operating settings is pre-stored in the LUT (step 815) during a stage of its manufacturing, the pre-calibrated information including operating settings pre-stored in the LUT may be used to set up the operating points of the receiver path (step 816) of the LPO transceiver 300.

During the operational control of the receiver path of the LPO transceiver 300, different from the operational control of the transmitter path, the microcontroller 340 checks whether there is bit error rate (BER) or signal to noise ratio (SNR) available from the host ingress receiver (step 820). If the host BER or SNR is available, the host BER or SNR is used to optimize the operating points of the receiver path (step 821) of the LPO transceiver 300. If no host BER or SNR is available, feedback of the ingress electrical signals from the signal analyzer 424 may be used to monitor and optimize the operating points of the receiver path (step 822) of the LPO transceiver 300.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A linear-drive pluggable optics (LPO) transceiver, the LPO transceiver comprising:
   a receiver path comprising:
      a receiver optical subassembly (ROSA) converting an input optical signal into an ingress electrical signal; and
      a linear transimpedance amplifier (TIA) with adjustable frequency transfer function (AFTF), the ingress electrical signal passing through the linear TIA to a host, wherein the linear TIA with AFTF comprises:
         a TIA;
         a continuous time linear equalizer (CTLE);
         a variable gain amplifier (VGA); and
         a signal analyzer,
            wherein the TIA, the CTLE, and the VGA are functionally connected in a series and provide a portion of the ingress electrical signal as feedback to the signal analyzer for controlling and monitoring, and
   a transmitter path comprising:
      a linear driver with AFTF receiving an egress electrical signal from the host; and
      a transmitter optical subassembly (TOSA) converting the egress electrical signal from the linear driver with AFTF into an output optical signal.

2. The LPO transceiver of claim 1, wherein the linear driver with AFTF comprises:
   a variable gain amplifier (VGA);
   a continuous time linear equalizer (CTLE);
   a boost amplifier (BA); and
   a signal analyzer,
   wherein the VGA, the CTLE, and the BA are functionally connected in a series and provide a portion of the egress electrical signal as feedback to the signal analyzer for controlling and monitoring.

3. The LPO transceiver of claim 2, wherein initial operating points of the transmitter path of the LPO transceiver are set up based on pre-calibrated information pre-stored in a look-up table (LUT) of the LPO transceiver during a stage of manufacturing thereof.

4. The LPO transceiver of claim 2, wherein initial operating points of the transmitter path of the LPO transceiver are set up based on link information provided by the host when no pre-calibrated information is stored in a look-up table (LUT) of the LPO transceiver.

5. The LPO transceiver of claim 2, wherein initial operating points of the transmitter path of the LPO transceiver are set up based on default setting of the LPO transceiver when no link information is provided by the host.

6. The LPO transceiver of claim 2, wherein operating points of the transmitter path of the LPO transceiver are controlled by a microcontroller based on the feedback of the egress electrical signal.

7. The LPO transceiver of claim 1, wherein both the input optical signal and the output optical signal have a signal rate of 25 GBaud or higher and are PAM4 optical signals.

8. The LPO transceiver of claim 1, wherein operating points of the receiver path of the LPO transceiver are controlled by a microcontroller based on bit-error-rate (BER) or signal-to-noise ratio (SNR) provided by the host.

9. The LPO transceiver of claim 1, wherein operating points of the receiver path of the LPO transceiver are controlled by a microcontroller based on the feedback of the ingress electrical signal when neither bit-error-rate (BER) nor signal-to-noise ratio (SNR) is provided by the host.

10. A method of operating a linear-drive pluggable optics (LPO) transceiver, the method comprising:
   sending a request to a host of the LPO transceiver for link information;
   when no response is received from the host, setting an initial operating condition of the LPO transceiver using a default setup; and
   when link information is received from the host, but there is no pre-calibrated host information stored in a look-up table of the LPO transceiver, setting an initial operating condition of the LPO transceiver using the link information received from the host.

11. The method of claim 10, further comprising:
   when pre-calibrated host information is stored in the look-up table of the LPO transceiver, setting an initial operating condition of the LPO transceiver using the pre-calibrated host information stored in the look-up table.

12. The method of claim 11, further comprising:
   providing feedback via a signal analyzer in a transmitter path of the LPO transceiver; and
   controlling and monitoring operation condition of the transmitter path based on the feedback.

13. The method of claim 11, further comprising:
   providing feedback via a signal analyzer in a receiver path of the LPO transceiver; and
   controlling and monitoring operation condition of the receiver path based on the feedback.

14. The method of claim 13, further comprising:
   receiving either a bit-error-rate (BER) or a signal-to-noise ratio (SNR) from the host; and
   controlling and monitoring operation condition of the receiver path based on either the BER or the SNR.

15. A linear-drive pluggable optics (LPO) transceiver, the LPO transceiver comprising a receiver path, the receiver path comprising:
   a receiver optical subassembly (ROSA) converting an input optical signal into an ingress electrical signal; and
   a linear transimpedance amplifier (TIA) with adjustable frequency transfer function (AFTF), the ingress electrical signal passing through the linear TIA to a host,
   wherein the input optical signal has a signal rate of 25 GBaud or higher and is a PAM4 optical signal, and
   the LPO transceiver further comprising a transmitter path, the transmitter path comprising:
   a linear driver with AFTF receiving an egress electrical signal from the host; and
   a transmitter optical subassembly (TOSA) converting the egress electrical signal from the linear driver to an output optical signal.

16. The LPO transceiver of claim 15, wherein the linear TIA with AFTF comprises:
   a TIA;
   a continuous time linear equalizer (CTLE);
   a variable gain amplifier (VGA); and
   a signal analyzer,
   wherein the TIA, the CTLE, and the VGA are functionally connected in a series and provide a portion of the ingress electrical signal as feedback to the signal analyzer for controlling and monitoring.

17. The LPO transceiver of claim 15, wherein the linear driver with AFTF comprises:
   a variable gain amplifier (VGA);
   a continuous time linear equalizer (CTLE);
   a boost amplifier (BA); and a signal analyzer,
wherein the VGA, the CTLE, and the BA are functionally connected in a series and provide a portion of the egress electrical as feedback to the signal analyzer for controlling and monitoring.

\* \* \* \* \*